United States Patent [19]

Eisler

[11] Patent Number: 4,832,452

[45] Date of Patent: May 23, 1989

[54] DEVICE FOR SETTING THE ANGULAR POSITION OF OPTICAL ELEMENTS

[76] Inventor: Gyula Eisler, 81/a Endrödi Sándor utca, 1026 Budapest, Hungary

[21] Appl. No.: 154,578

[22] Filed: Feb. 10, 1988

[30] Foreign Application Priority Data

Feb. 12, 1987 [HU] Hungary .................................. 540/87

[51] Int. Cl.$^4$ ................................................ G02B 7/02
[52] U.S. Cl. ...................................... 350/321; 350/247; 350/252
[58] Field of Search ................ 350/321, 247, 251, 252, 350/287; 248/560, 561, 570, 592, 593, 603, 607, 608, 514, 515, 516, 521, 524

[56] References Cited

U.S. PATENT DOCUMENTS

| | | | |
|---|---|---|---|
| 3,508,832 | 4/1970 | Schroeder | 350/287 |
| 4,099,852 | 7/1978 | Kobierecki et al. | 350/247 |
| 4,408,830 | 10/1983 | Wutherich | 350/252 |

Primary Examiner—John K. Corbin
Assistant Examiner—Loha Ben
Attorney, Agent, or Firm—Young & Thompson

[57] ABSTRACT

A device is provided with at least one parallelogram-shaped suspension mechanism built up with arms arranged along parallel planes and deformation joints interconnecting the arms and a setting device both of which are fastened to a table provided with a through hole and suitable for clamping the optical element to be set. Advantage of the setting device according to the invention is represented by the unvarying setting of the angular position of an optical element with a setting and resetting accuracy identical with or better than the wavelength of the light. Construction of the setting device is simple since its production does not require special technology. The setting device is applicable to advantage for optical measurement requiring high setting and resetting accuracy and unvarying setting, mainly in the case of lasers.

7 Claims, 3 Drawing Sheets

DEVICE FOR SETTING THE ANGULAR POSITION OF OPTICAL ELEMENTS

FIELD AND BACKGROUND OF THE INVENTION

The invention relates to a device for setting the angular position of optical elements applicable to advantage for optical measurements, e.g. for setting the angular position of mirrors and lenses around a specific axis with interferometric and unvarying accuracy.

It is common knowledge that in the course of realizing the optical measuring arrangements, all optical elements of the arrangement have to be set in relation to the beam path. The required setting accuracy is determined by the optical measurement to be realized. As the laser becomes generally used in the practice, the setting accuracy is to be interferometric, i.e. identical with or more accurate than the wavelength of the light. This means that the angular position of the optical elements requires setting accuracy within a few seconds and resetting accuracy less than one second.

In the known devices used for setting the angular position of optical elements, the structural members moving in relation to each other are interconnected with slipping or rolling elements. It is generally known that in case of such devices improvement of the setting accuracy is restricted by the stick slip resulting from the slipping or rolling friction of the structural members moving in relation to each other. The resetting accuracy generally well exceeds the value of 10 seconds (e.g. in case of the Hungarian patent application No. MA 2835), where the value of angle resolution is 30 seconds.

In the Hungarian patent specification No. 177,229, an angle-setting device is described, provided with torsional bearing formed by plate springs.

This angle-setting device provides the optical path for the beam of light with a through hole in the axis of rotation. Since the kinematic contact between the object table and the stationary part of the device is free from external friction, the stick slip is therefore eliminated. This however involves the use of such deformation joint instead of the kinematically well defined link work, the kinematic functioning of which depends not only on geometric but other parameters (e.g. strength, assembly) and on the load as well. Consequently, the fact that the position of the axis of rotation of the torsional bearing built up with plate springs is considerably influenced by two factors, i.e. deviation of the spring constants of the plate springs and the load determined by the mass of the optical element to be set, represents a serious drawback.

The spring constants of plate springs are determined by several parameters, e.g. geometry, composition, heat treatment, etc., hence even in case of the most careful production technology, a considerable deviation of the spring constant has to be reckoned with.

Further shortcoming of the device is that uniformity of the clamping on both ends of the plate springs cannot be ensured even with the most careful assembly. Another shortcoming is the relatively large external dimension pertaining to the internal through hole, as well as its extremely careful and therefore costly production technology.

The final result of the described shortcomings is that the device is suitable only for such kinds of setting purpose, where drifting of the axis of rotation of the optical element is permissible. Consequently, the above described device is not suitable for the unvarying setting of optical elements with interferometric accuracy, hence it is unobtainable in the trade.

DISCLOSURE OF THE INVENTION

The invention is aimed at the elimination of the described shortcomings, and the realization of a device suitable for unvarying setting of optical elements with interferometric accuracy, in other words, to prevent the axis of rotation from drifting while setting the required angular position of the optical element, furthermore the construction of which is simple and the production is economical.

The problem is solved according to the invention with a device suitable for the unvarying setting of optical elements with interferometric setting and resetting accuracy, the construction of which is simple and economically producible, and it is provided with a through hole in the axis of rotation for the beam of light.

The invention is based on the recognition, that the problem is solved in a simple way by using a lever mechanism engaged with joints for setting the angular position of the optical element, the displacement vector of its two points arranged symmetrically to the theoretical axis of rotation coinciding with the optical axis is of the same size, parallel and of opposite sense, and the distance between these two points does not vary in the course of movement. If the table holding the optical element is hinged to these two points of the lever mechanism, the rotary motion of the optical element around the theoretical axis is accomplished.

Thus the device according to the invention used for setting the angular position of a known optical element is provided with a stand, a table for holding the optical element, a table suspension mechanism and a setting device.

The further development, i.e. the invention is found in the fact that the device is provided with at least one parallelogram-shaped actuating mechanism built up with supporting arms and actuating levers, and a table suspension mechanism consisting of a bearing frame arranged along parallel planes between the stand and table. Four joints interconnecting the supporting arms and actuating levers of the actuating mechanism at the tips of the parallelogram, i.e. two joints are arranged in two points of the bearing frame fitting to the centers of the actuating mechanism's supporting arms interconnecting the bearing frame with the supporting arms to a single unit, and two deformation joints are arranged in the centers of the actuating levers interconnecting the actuating mechanism with the stand, and a setting device is arranged between the stand and the bearing frame.

According to the invention, the suspension mechanism is provided with at least one further diamond-shaped actuating mechanism turned at 90°, and a square bearing frame which are both fitted with deformation joints interconnecting one another and the stand. This construction improves the loadability, moreover it allows asymmetric load as well.

In this case, the bearing frame is provided with a supporting plate fitted with a central hole, and having four deformation joints arranged along the horizontal and vertical axes, as well as four coupling arms connected to the supporting plate.

The setting device can be realized in a simple way with the use of a micrometer fixed to a micrometer holder arranged on the stand, resting on the actuating bracket connected with the supporting plate of bearing frame. Resting of the micrometer on the actuating bracket can be reliably solved by a draw spring interconnecting the micrometer holder with the actuating bracket.

To improve the setting accuracy—in a specific case for electrically controlled setting—differential micrometer or controlled setting element (piezoelectric, magneto-strictive, etc.) is applicable. The deformation joints are realizable with two tangentially approaching holes, each pair machined from the actuating mechanisms and the bearing frames. Gaps and slots adjoin the holes allowing deformation of the joints around the center.

The deformation joints interconnecting the supporting arms and actuating levers of the actuating mechanisms with each other and with the bearing frame, as well as with the stand can be machined from plate springs. However, this solution according to the invention—contrary to the solution described in patent No. 177 229—allows unvarying setting.

BRIEF DESCRIPTION OF THE DRAWINGS

The device according to the invention is described in detail with the aid of drawing, in which.

DETAILED DESCRIPTION OF THE PREFERRED EMBODIMENT

Figure 1:
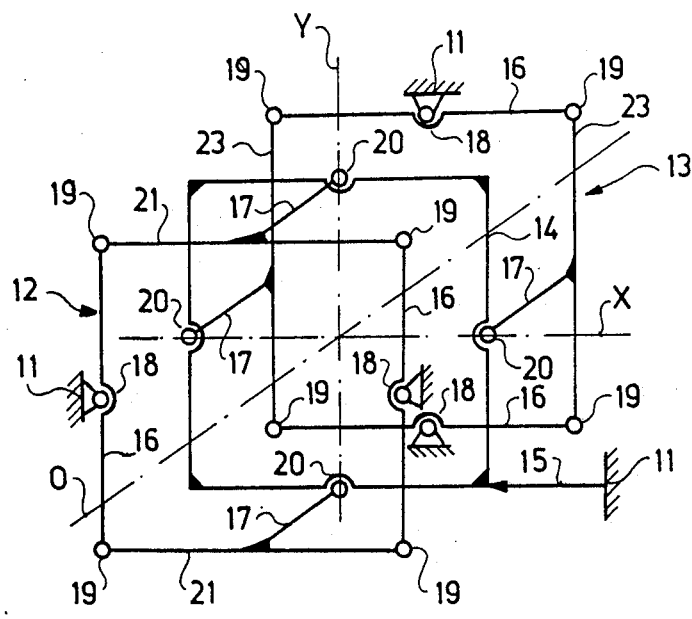
FIG. 1 shows the kinematic outline of the device according to the invention.

The kinematic outline of the device shown in FIG. 1 illustrates the stand 11, first and second suspension mechanisms 12 and 13, table 14, setting device 15, supporting-, mobile- and coupling joints 18, 19, 20, respectively, machined as deformation joints, optical axis 0, and horizontal and vertical axes X and Y. The first and second suspension mechanisms 12 and 13 each consist of two actuating levers 16 on the opposite sides of table 14, which are engaged with the first and second coupling arms 21 and 23.

The first and second suspension mechanisms 12 and 13, as well as the table 14 are machined as coincident parallelogram, rhombus, rectangle, or square arranged along planes parallel with each other. In case of lighter loads, the first and second suspension mechanisms 12 and 13 can be machined as rectangles, moreover the second suspension mechanism 13 may be dispensed with in a specific case. If the load conditions permit, one of the actuating levers 16 of the first suspension mechanism 12 or those of the first and second suspension mechanisms 12 and 13 may be dispensed with. In this case, the loadability is restricted by the fact that the table 14 can be connected to the first suspension mechanism 12 with two coupling joints 20 only along the vertical axis Y, and the deformation joints are only a few tenths of a millimeter thick for the sake of elasticity required for their operation, hence they are suitable only for the assumption of lighter loads. For the assumption of heavier loads occuring in practice, the second suspension mechanism 13 is used, turned at 90° in relation to the first suspension mechanism 12. The coupling joints 20 fixed to table 14 are situated along the horizontal and vertical axes X and Y. This way, the setting device is capable to take up moments arising in the planes perpendicular to the horizontal axis X, vertical axis Y and intermediate axes without damage. In case of such construction, the first and second suspension mechanisms 12 and 13 and the table 14 should be only square or diamond shaped as a result of the arrangement.

The first and second suspension mechanisms 12, 13 are provided with mobile joints 20 at the tips of the square, supporting joint 18 is arranged in each center of the actuating levers 16 along the horizontal and vertical axes X and Y fixed to stand 11. The coupling joints 20 arranged in the side center of table 14 are linked by distance 17 with the first and second coupling arms 21 and 23 of the first and second suspension mechanisms 12 and 13. The angular displacement of table 14 around the optical axis 0 is provided by the axial moment of the optical axis 0. This moment is realized by the setting device 15 fixed to the stand 11.

Figure 2:
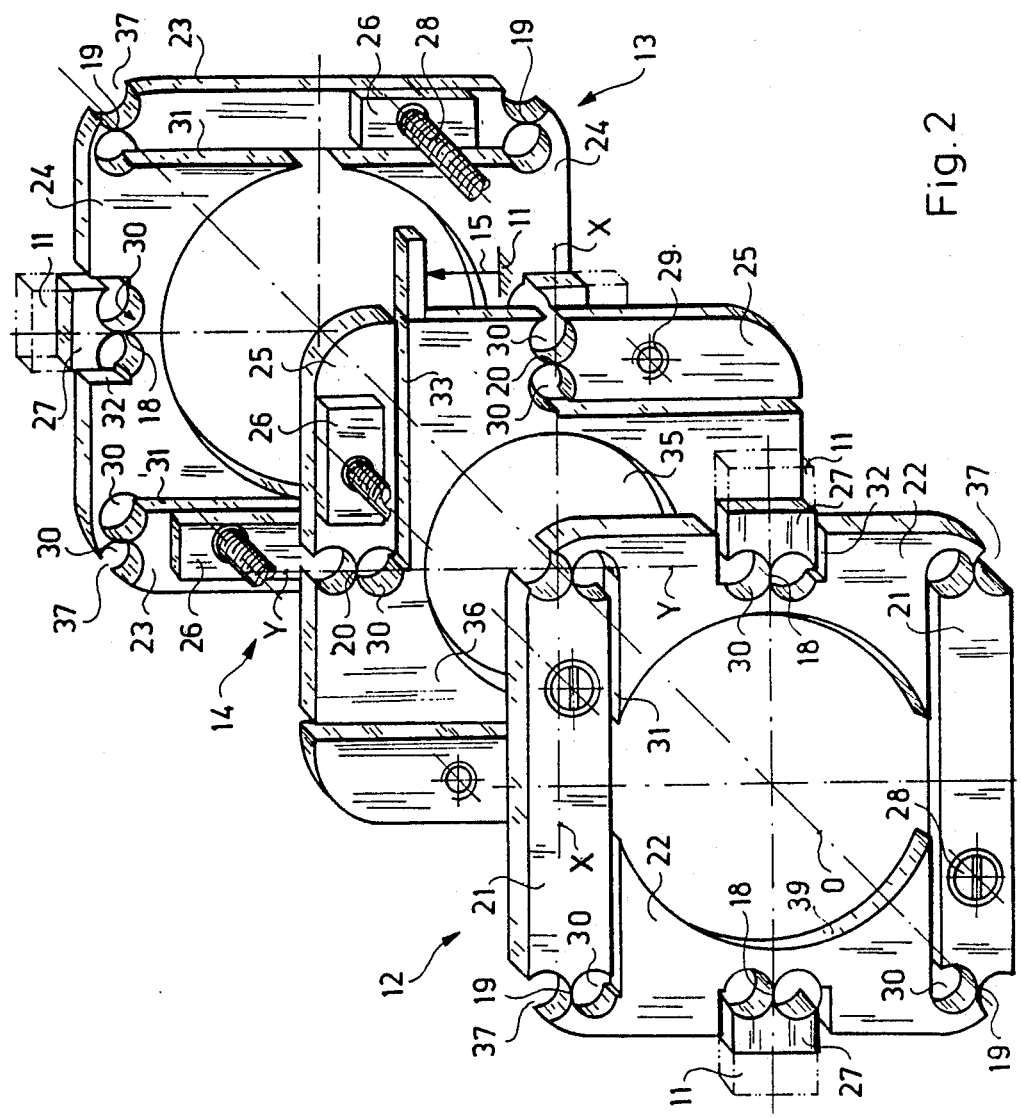
FIG. 2 is the perspective view of the device.

The perspective view of the device according to the invention shown in FIG. 2, illustrates the practical construction of the first and second suspension mechanisms 12 and 13, table 14 and the connected main parts and part-solutions. The table 14 is machined from flat plate 36 provided with central hole 35.

The first suspension mechanism 12 consists of two first coupling arms 21, two first actuating levers 22, the second suspension mechanism 13 consists of two second coupling arms 23 and two second actuating levers 24. The theoretical length of the first and second actuating levers 22 and 24 and the first and second coupling arms 21 and 23 is the same, and they are arranged on the sides of two coincident, parallel running squares. Mobile joints 19 are arranged on the ends of the first and second actuating levers 22 and 24, i.e. on the tips of the square, and supporting joints 18 are formed in the center of the first and second actuating levers 22 and 24. The first and second actuating levers 22 and 24 are interconnected through mobile joints 19 on their ends with the first and second coupling arms 21 and 23. The supporting joints 18 are fixed through retaining blocks 27 to stand 11. The internal faces of the first and second actuating levers 22 and 24 are adapted to the central hole 35 of table 14, and do not reduce its effective cross section.

Table 14 is situated in a plane parallel with the plane of and between the first and second suspension mechanisms 12 and 13. The table 14 is machined as flat plate 36 provided with a central hole 35, and coupling joint 20 was formed in each center of the sides, each coupling joint 20 is connected to a coupling extension 25 machined from the same flat plate 36. The first and second coupling arms 21 and 23 are fastened together with the opposite arranged coupling extensions 25 with the aid of distance pieces 26, screws 28 and threaded holes 29. By fastening, these structural elements constitute a single unit and upon the effect of tangential motion brought about with the setting device 15 fixed on stand 11, the table 14 can be set to the required angular position around the optical axis 0.

The deformation joints constituting the supporting joints 18, mobile joints 19 and coupling joints 20 are limited by holes 30 arranged at a distance of a few tenths of a millimeter. First gap 31, second gap 32, third gap 33 and slot 37 required for their functioning were machined on the first and second suspension mechanisms 12 and 13 and on flat plate 36.

The figure illustrates that two suspension blocks 27 interconnecting the suspension mechanisms 12 and 13 with stand 11 are arranged along the horizontal axis X and vertical axis Y, whereby the table 14 of the mechanism is suitable for the assumption of horizontal axis X, vertical axis Y and intermediate forces of considerable magnitude.

Figure 3:
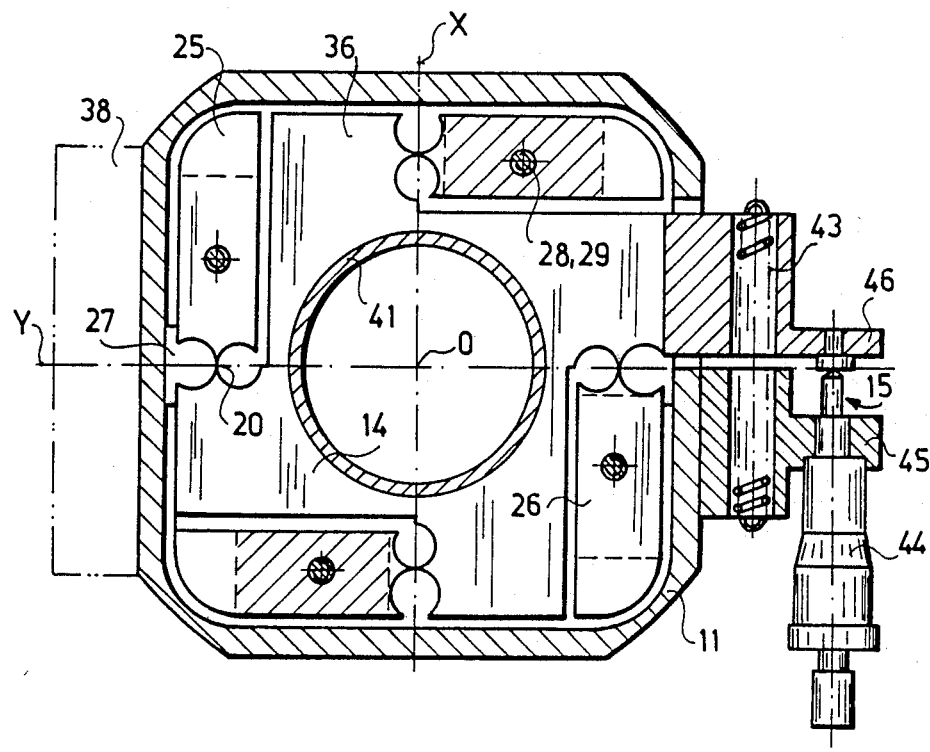
FIG. 3 shows a sectional front view of the device taken along line III—III in FIG. 4.
Figure 4:
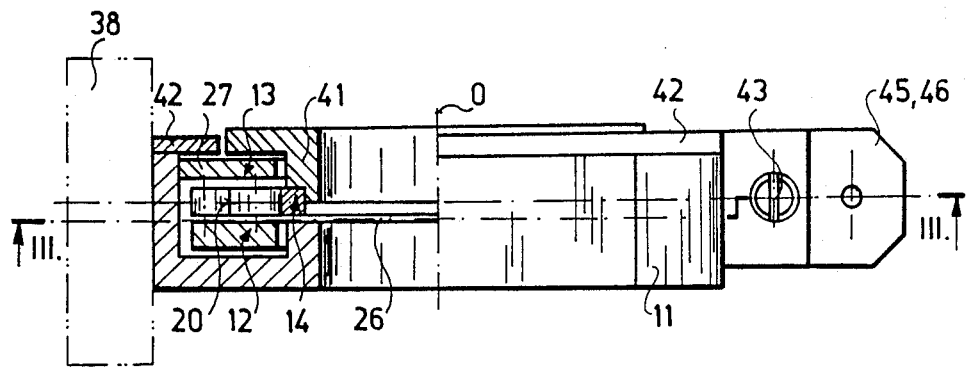
FIG. 4 shows the semi-sectional side view of the device shown in FIG. 3.

The actual construction of the whole mechanism according to the invention is shown in FIGS. 3 and 4. The sectional front view of the setting device in FIG. 3 was prepared with the section plane between the first suspension mechanism 12 and table 14. Side view of the setting device is shown in semi-sectional view in FIG. 4, the first and second suspension mechanisms 12 and 13 and table 14 are arranged in frame-shaped stand 11 fixed to pedestal 38 and they are fixed to stand 11 through suspension block 27.

Supporting element 41 for clamping the adjustable optical element is fixed to table 14. Among the parts of the setting device 15, the micrometer holder 45 is fixed to stand 11 and the actuating bracket 46 to the table 14. The micrometer 44 is fixed in the holder 45 and its tip is in contact with the actuating bracket 46. Draw spring 43 provides permanent kinematic engagement free from play between the table 14 and cover 42. Preferably differential micrometer is used for the purpose of micrometer 44. FIGS. 3 and 4 in accordance with FIG. 2 illustrate the location, shape and layout of the coupling joints 20, optical axis 0, coupling extension 25, distance pieces 26, screws 28, threaded holes 29, horizontal and vertical axes X and Y.

The optical element clamped in the supporting element 41 can be set with the micrometer 44 of the setting device fixed to stand 11 to the required angular position with high setting and resetting accuracy. In the course of setting, the first and second actuating levers 22 and 24 of the parallelogram or square shaped first and second suspension mechanisms 12 and 13 perform identical angular displacement, and table 14 fixed with coupling joints 20 in the center of the first and second coupling arms 21 and 23 perform clear angular displacement identical with that of the first and second actuating levers 22 and 24 without moving off in relation to the original position of the instantaneous actual center of rotation. Advantage of the device according to the invention is that it provides unvarying setting of the angular position of the optical element with high interferometric setting and resetting accuracy.

The device is suitable for the assumption of any directional moments of load occuring in the practice without detrimental effect, i.e. its unvarying setting and resetting accuracy is independent from the magnitude of load. Despite the high setting and resetting accuracy, construction of the device is simple and its production is economical.

The device can be used to advantage for optical measurements requiring high setting and resetting accuracy and unvarying setting, applicable mainly in case of lasers.

I claim:

1. A device for setting the angular position of an optical element with high accuracy, comprising a stand, a table rotatably connected to the stand for clamping the optical element, a setting device in contact with the stand and table for actuating rotation of the table about an axis, and a first table-rotating suspension mechanism connected with the stand through at least two fixed supporting joints, said suspension mechanism containing at least two actuating levers each journaled as a two-armed lever having two opposite shanks and coupling arms each having two ends, each end being jointed to each opposite shank of each actuating lever through mobile joint, and the coupling arms are connected to the table by coupling joints located thereon, where the mobile joints fixed to the same actuating lever, and the coupling joints connected to the respective mobile joints through coupling arms are located on the tips of a parallelogram, furthermore the supporting, mobile and coupling joints are machined as deformation joints.

2. The device according to claim 1, wherein said at least two actuating levers of the suspension mechanism are parallelly arranged on opposing sides of the table, and said opposite shank is interconnected with each end of each coupling arm, and the coupling arms are connected to the table by two coupling joints, furthermore the supporting joints are arranged along a line that is parallel with the line interconnecting the mobile joints on the same coupling arm.

3. The device according to claim 1, further comprising a second suspension mechanism arranged at an angle to said first suspension mechanism, said mechanisms being attached to the table by two pairs of coupling joints situated on two straight lines perpendicular to one another.

4. The device according to claim 1, wherein coupling extensions are attached to the table through coupling joints connected to the coupling arms by distance pieces and said coupling extensions are fixed to said coupling arms by screw means.

5. The device according to claim 1, wherein said table is a first flat plate, and the coupling joints are machined as extension of the first flat plate, furthermore the first suspension mechanism is a second flat plate parallel with the first flat plate, from which the supporting and mobile joints are machined as extensions.

6. The device according to claim 5 further comprising a second suspension mechanism consisting of a third plate parallel with said first and second plates and having the same form as said second plate and arranged at a right angle to said second plate on the opposite side thereof with respect to the table.

7. The device according to claim 1 wherein the supporting, mobile and coupling joints are deformation joints machined from plate springs.

* * * * *